United States Patent [19]
Kline

[11] Patent Number: 5,937,342
[45] Date of Patent: Aug. 10, 1999

[54] WIRELESS LOCAL DISTRIBUTION SYSTEM USING STANDARD POWER LINES

[75] Inventor: Paul A. Kline, Germantown, Md.

[73] Assignee: Dynamic Telecommunications, Inc., Germantown, Md.

[21] Appl. No.: 08/789,285

[22] Filed: Jan. 28, 1997

[51] Int. Cl.[6] .............................. H04M 9/00; H04H 1/00; H04H 1/14
[52] U.S. Cl. ............................ 455/402; 455/3.1; 455/3.3
[58] Field of Search ............................ 455/402, 3.1, 3.3, 455/14, 561, 562, 457; 340/310.01, 870.01, 870.02, 310.08

[56] References Cited

U.S. PATENT DOCUMENTS

| | | | |
|---|---|---|---|
| 3,942,168 | 3/1976 | Whyte | 340/310.01 |
| 3,967,264 | 6/1976 | Whyte et al. | 340/310.08 |
| 4,119,948 | 10/1978 | Ward et al. | 340/870.02 |
| 4,495,386 | 1/1985 | Brown et al. | 455/402 |
| 4,644,321 | 2/1987 | Kennon | 340/870.02 |
| 5,432,841 | 7/1995 | Rimer | 455/457 |
| 5,630,204 | 5/1997 | Hylton et al. | 455/3.3 |
| 5,770,996 | 6/1998 | Severson et al. | 340/310.08 |

Primary Examiner—Dwayne D. Bost
Assistant Examiner—Quochien B. Vuong
Attorney, Agent, or Firm—Roberts & Abokhair, LLC

[57] ABSTRACT

A system and method to connect standard telephone subscriber equipment (telephone, facsimile, personal computer) to a fixed wireless terminal via power lines. The system comprises fixed wireless terminals connected to a power line interface device. Subscriber equipment is connected to the power line interface device thereby allowing telecommunication signals to be transmitted to the fixed wireless terminal for subsequent wireless transmission. The fixed wireless terminal exists at an individual subscriber's home/business within a given step-down power transformer cluster. The step-down power transformer provides signal isolation so that the same or similar addresses can be used between clusters without confusion as to the identity of the individual subscriber. The FWT is also connected to the power meter at a subscriber location such that power utilization can be communicated to the power company in a wireless fashion.

11 Claims, 5 Drawing Sheets

WIRELESS LOCAL DISTRIBUTION SYSTEM USING STANDARD POWER LINES

FIELD OF THE INVENTION

The present invention relates generally to wireless communications. More specifically the invention describes a method and apparatus for using the power lines that exist in a home or business to connect to a fixed wireless terminal for subsequent transmission of telecommunications.

BACKGROUND

In many undeveloped areas and undeveloped countries wireless communications offers a sane method of providing communication without the need for major expenditures of funds for outside-plant communications infrastructure (i.e. telephone poles, lines, other facilities). However, even with certain so-called "wireless" systems, some communications wiring is still required within a home or business so that communications equipment can be connected to the fixed wireless terminal. Once communications to the wireless terminal are established, the wireless terminal can communicate in a true wireless fashion to other wireless terminals or to a base station thereby avoiding the more extensive outside-plant communications infrastructure.

While electrical power in various forms has reached many homes throughout the world, parallel communications wiring has not been so extensively installed. Therefore in many third-world countries power wiring may exist within a home or business but communications wiring might not. This poses a significant barrier to many individuals and businesses who must install communications wiring in order to be able to communicate via conventional wired communications equipment or the new wireless terminals.

In addition to the in-home/in-business communications wiring required, the present topology for fixed wireless terminals requires that a transceiver be installed in each user's location. It is not now possible to have multiple users at different locations take advantage of the communications capability of a single fixed wireless terminal (FWT).

SUMMARY OF THE INVENTION

It is therefore the object of the present invention to utilize the power lines that are installed in homes and businesses as a way to interface with fixed wireless terminals to conduct subsequent wireless telecommunications.

It is a further object of the present invention to interface multiple types of telecommunications equipment (e.g. telephone, fax, computer) to the power line in a home or business where power lines are in turn connected to a fixed wireless terminal for subsequent wireless telecommunications.

It is yet another object of the present invention to allow multiple users (i.e. different homes or businesses) having a plurality of telecommunications equipment to interface with a single FWT via power lines for subsequent wireless telecommunications.

It is another object of the present invention to provide an interface for the fixed wireless terminal to the power meter attached to the power wiring in a home or business to communicate power utilization to the power company in a wireless fashion.

The wireless local loop distribution system (the present invention) uses standard power lines in a home or business to communicate with a fixed wireless terminal. In this fashion the telecommunications equipment attached to the power lines can use the FWT to communicate in wireless fashion to other FWT's in a network or to a base station.

In many countries there is little telecommunications infrastructure. Telephone and other data wiring simply does not exist in homes or business. Simultaneously, however, electrical power lines have been installed in many third-world or developing countries. Use of these power lines provides a cost-effective method of rapidly deploying a wireless local loop system which depends upon power lines for communication with an FWT.

In an electric power distribution system, step-down power transformers are used by a company to convert higher voltage of several kilovolts to the 110/120 volts required by the home. While several homes may be connected to each step-down power transformer, the transformer effectively isolates the homes or business connected to it. This is referred to as a transformer cluster. As a result, any communications signals flowing over the power lines are effectively isolated by the local step-down power transformer.

The present invention employs a power line interface device (PLID) which provides all of the interface capability necessary to connect plain old telephone service (POTS) via, for example, an RJ11 plug, RS-232 ports for computer communication and exchange of data via the TCP/IP protocol. Using a single PLID attached to the internal power wiring of a home, a user can connect a telephone, fax, or computer to the PLID which in turn is connected to the internal power wiring of the home. Also attached to the power wiring of the home is a fixed wireless terminal (FWT). The FWT communicates with the telecommunications equipment in a wireless fashion.

Thus the present invention allows the internal power wiring of homes to serve as the means by which telecommunication signals are sent to the FWT for subsequent telecommunications. An alternative topology can also be supported by the present wireless invention whereby multiple homes or businesses are connected to a single FWT with no multiplexing capability. The single FWT can then serve the telecommunication needs of several homes or businesses simultaneously provided that those businesses are all located within the local transformer cluster. This type of topology further reduces the cost of wireless telecommunications since a single FWT can serve the needs of several homes or businesses at the same time. The present invention achieves significant savings in several fashions. First, telecommunications wiring within a home or business is avoided. The present invention simply relies upon the power lines already installed within the home or business. Further, having several homes or businesses using the same FWT results in additional savings since the more expensive FWT's are required for a group of subscribers as opposed to one FWT for each subscriber. These advantages and others will be obvious to those skilled in the art after review of the detailed description of the present invention which follows:

DETAILED DESCRIPTION

Figure 1:
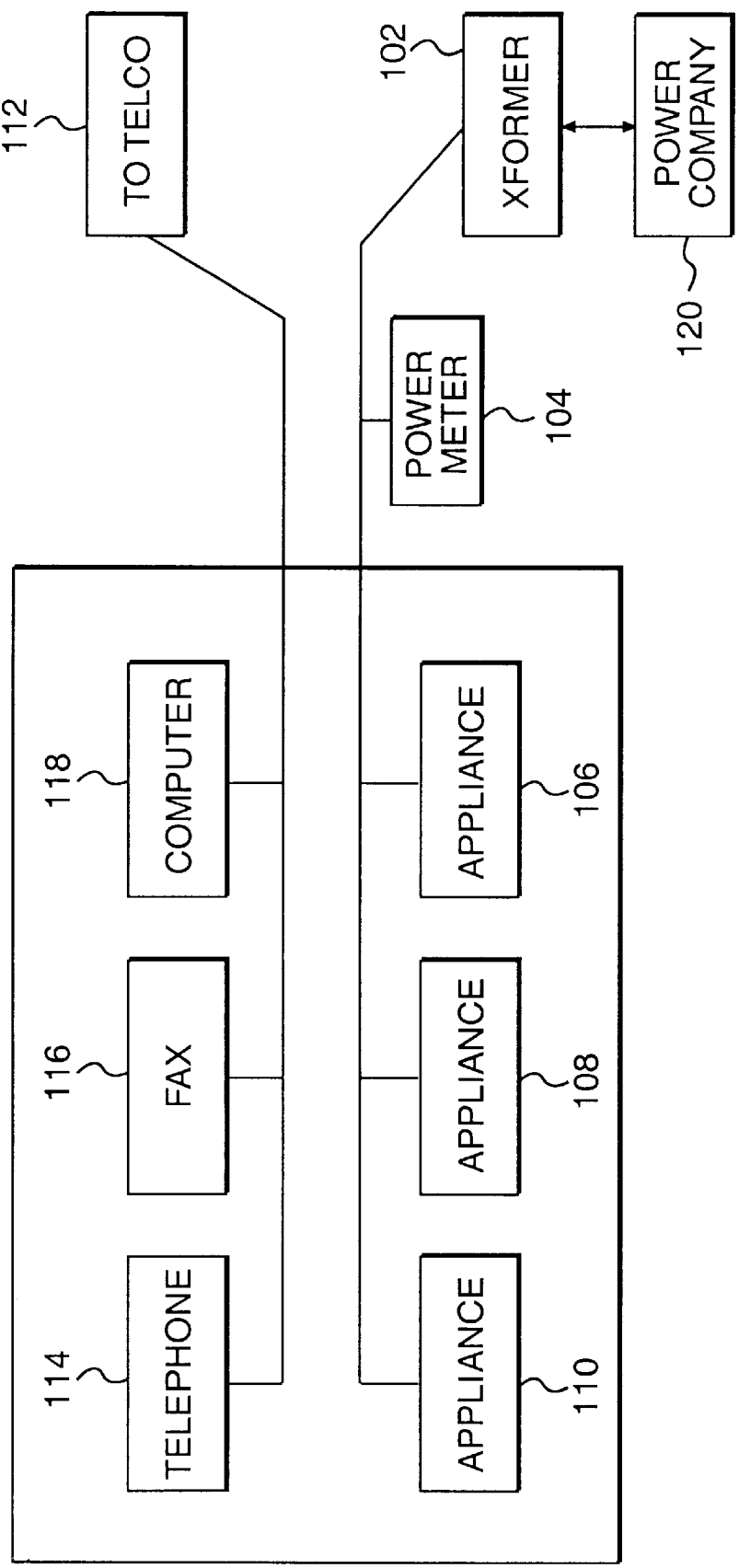
FIG. 1: Typical Power/Communications Installation

Referring to FIG. 1 a typical power/communication installation in the home or businesses is shown. The power company distributes power over its network to a series of step-down down power transformers 102. A single step-down power transformer 102 can serve the needs of several homes or businesses. In general however the power line from the step-down power transformer 102 passes to an electrical meter 104 at the individual home or business. Thereafter power is distributed over internal power wiring to various appliances (106,108,110) which could be electrical equipment of a wide variety of types. Simultaneously the telephone company 112 provides wiring over its network directly to the home to which may be attached the telephones 114, faxes 116, computers 118. Thus it can be seen that two separate systems are required to provide power and telecommunication services to an individual home or business.

Figure 2:
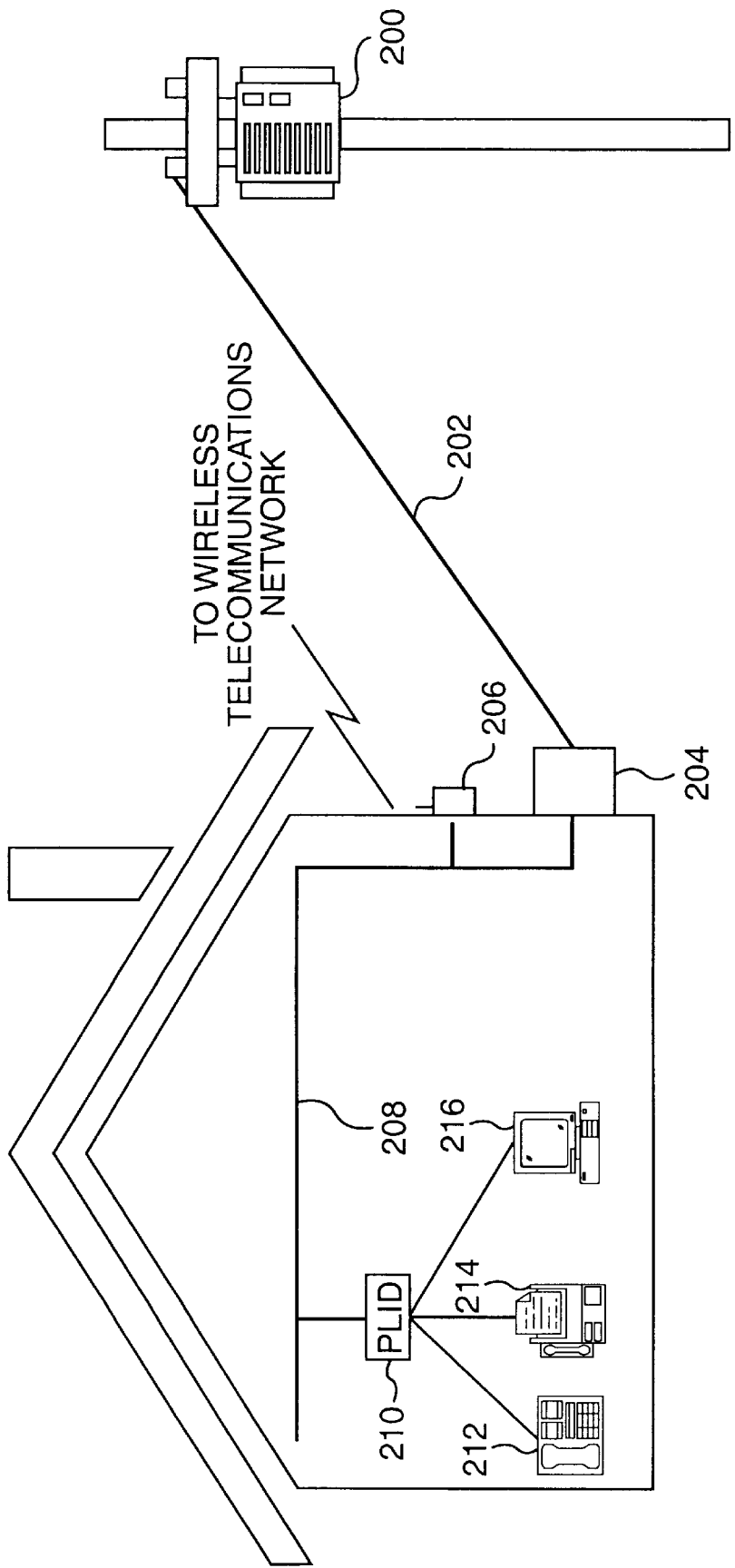
FIG. 2: Using Power Wiring for Telecommunications

Referring to FIG. 2 an installation is shown using the power wiring for telecommunications. The power company delivers power usually in the several kilovolt range to a step-down power transformer 200. The transformer steps down the voltage down (e.g. to 110 volts or 120 volts) as required and provides that power over power line 202 to a power meter 204 located at a home or business. Thereafter power is provided internally to the home or business over internal wiring 208. In the present invention an FWT 206 is connected in parallel to the wiring 208. The power line interface device (PLID) 210 of the present invention is connected to the internal power wiring 208. The PLID provides interface means for plain old telephone service (POTS), and data through for example a RS-232 port or Ethernet connection. Thus a user can connect a telephone 212, a fax 214 and/or a computer 216 to the PLID 210. A user can have multiple PLID's within any particular installation. This type of installation eliminates the need to wire the subscriber's premises for telecommunications. Currently, the internal wiring of a home or business will typically support data rates of up to 100 kilobits per second with $10^{-9}$ bit error rate (BER), however this may increase in the future.

The power company's step-down power transformer provides isolation which is critical since each device on the power line in the home or business has a unique address and since only a limited number of devices may be connected to the power lines within each cluster within a transformer area.

Figure 3:
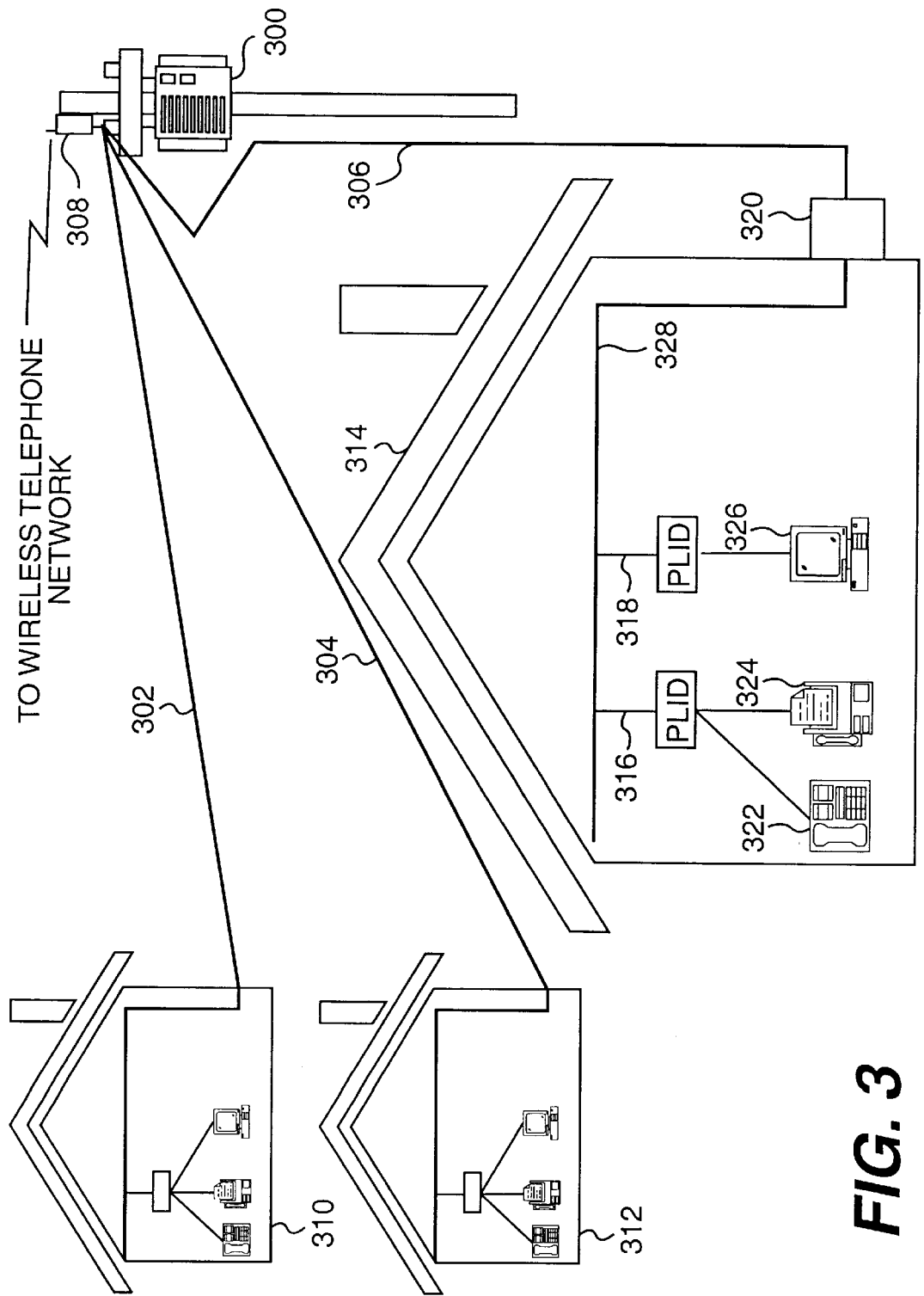
FIG. 3: Alternative Topology for Using Power Lines for Telecommunications

Referring to FIG. 3 a power line telecommunication distribution system for multiple subscribers is shown. Power is provided by the power company to the local step-down power transformer 300. Thereafter power is sent to individual homes/businesses 310, 312, 314. An FWT 308 is attached to the external power wires 302, 304, 306 which go to the individual homes/business. The external power wiring is then connected to a typical power meter 320 and proceeds to the internal power wiring of the home or installation 328. PLID's 316, 318 are attached to the internal power wiring allowing the interface of telephones 322, fax 324, and computers 326 to the PLID's. The PLID's are in turn connected to the internal power wiring 328. Communication is then effected by signals being sent by the telecommunications equipment (telephone, fax and computers, etc.) via the PLID to the internal wiring. However, in this instance the signals from multiple homes/businesses are then routed through the FWT 308 for subsequent transmission. The FWT has the ability to multiplex signals coming from the individual homes/businesses 310, 312, 314. In this fashion a single FWT can serve the needs of multiple homes/businesses thereby further driving down the cost of telecommunications.

Figure 4:
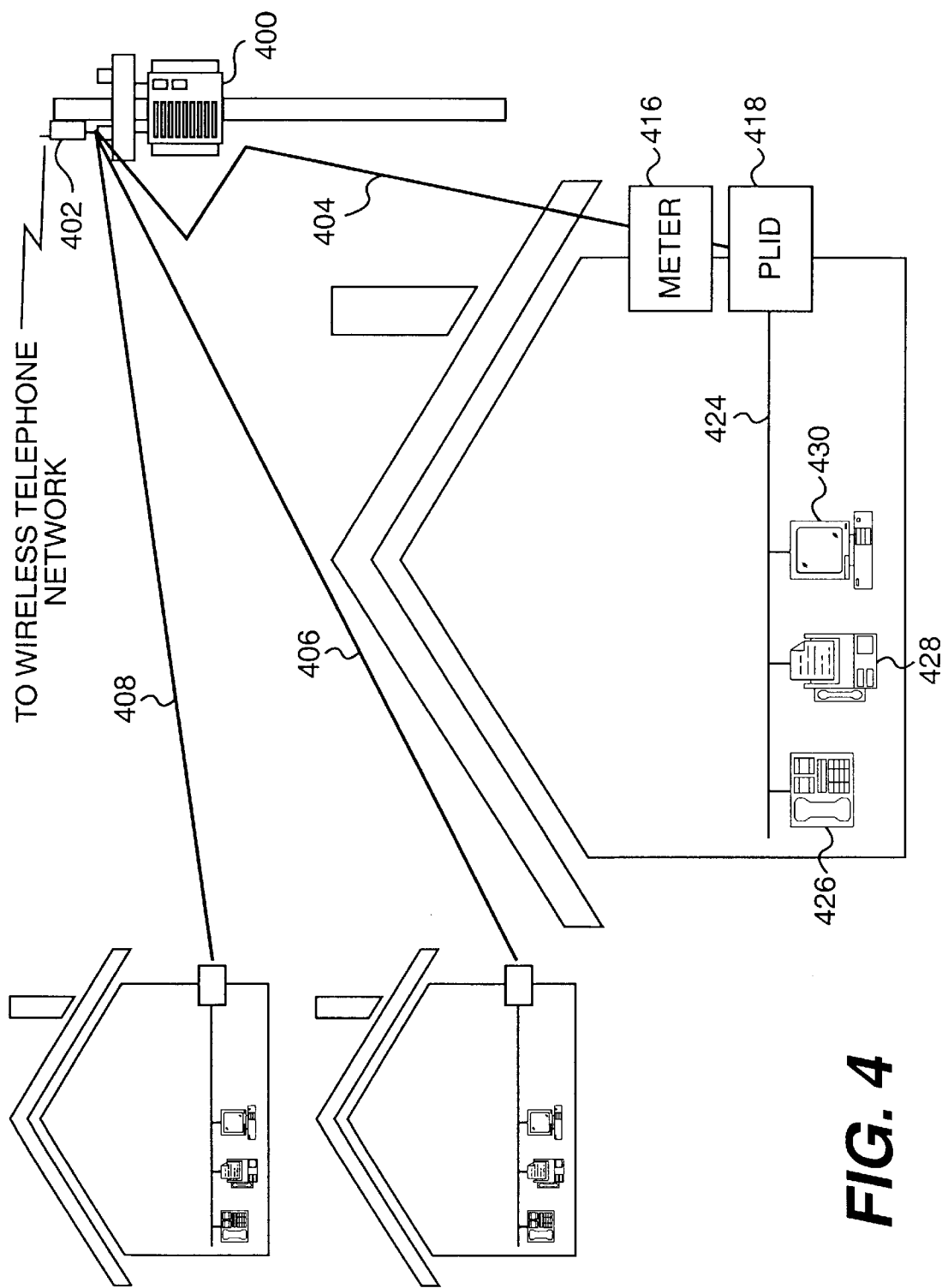
FIG. 4: Another Alternative Topology for Using Power Lines for Wireless Telecommunications

Referring to FIG. 4 an installation for use of FWT's for homes/businesses having telecommunications wiring is shown. The present invention works equally well and economically for those homes/businesses which do have internal telecommunications wiring. In this case telecommunications equipment 426, 428, 430 are connected to internal communications wiring 424. The internal communications wiring 424 is in turn connected to a PLID 418 which is connected to the power meter 416. The power meter is the standard power meter that measured power utilization at a home or an installation.

Telecommunication signals are sent via the PLID over power lines 404, 406, 408 to an FWT 402 at the same location as the power company transformer 400. The power company step-down power transformer 400 provides isolation of signals such that telecommunication signals stay within the transformer cluster. The FWT then multiplexes telecommunication signals and transmits those in wireless fashion to other wireless communications capabilities.

The above topology allows the reuse of the same address within a transformer cluster as is used in other transformer clusters. Since isolation is provided by the step-down power transformer there is no danger of the same address causing confusion as to the identity of the actual subscriber.

The FWT comprises a transceiver such as the Dynaloop family of transceivers from Dynamic Telecommunications, Inc. of Germantown, Md. and a power network interface module such as the AN1000 from Adaptive Networks, Inc. of Cambridge, Mass. The transceiver interfaces between the wireless network and the power network. Subsequent wireless communication can be either with a base station or with another FWT as in a peer to peer communications network, or any other wireless network scheme.

Each PLID has a power network interface and a subscriber equipment interface. The power network interface is the same type as is used in the FWT.

Figure 5:
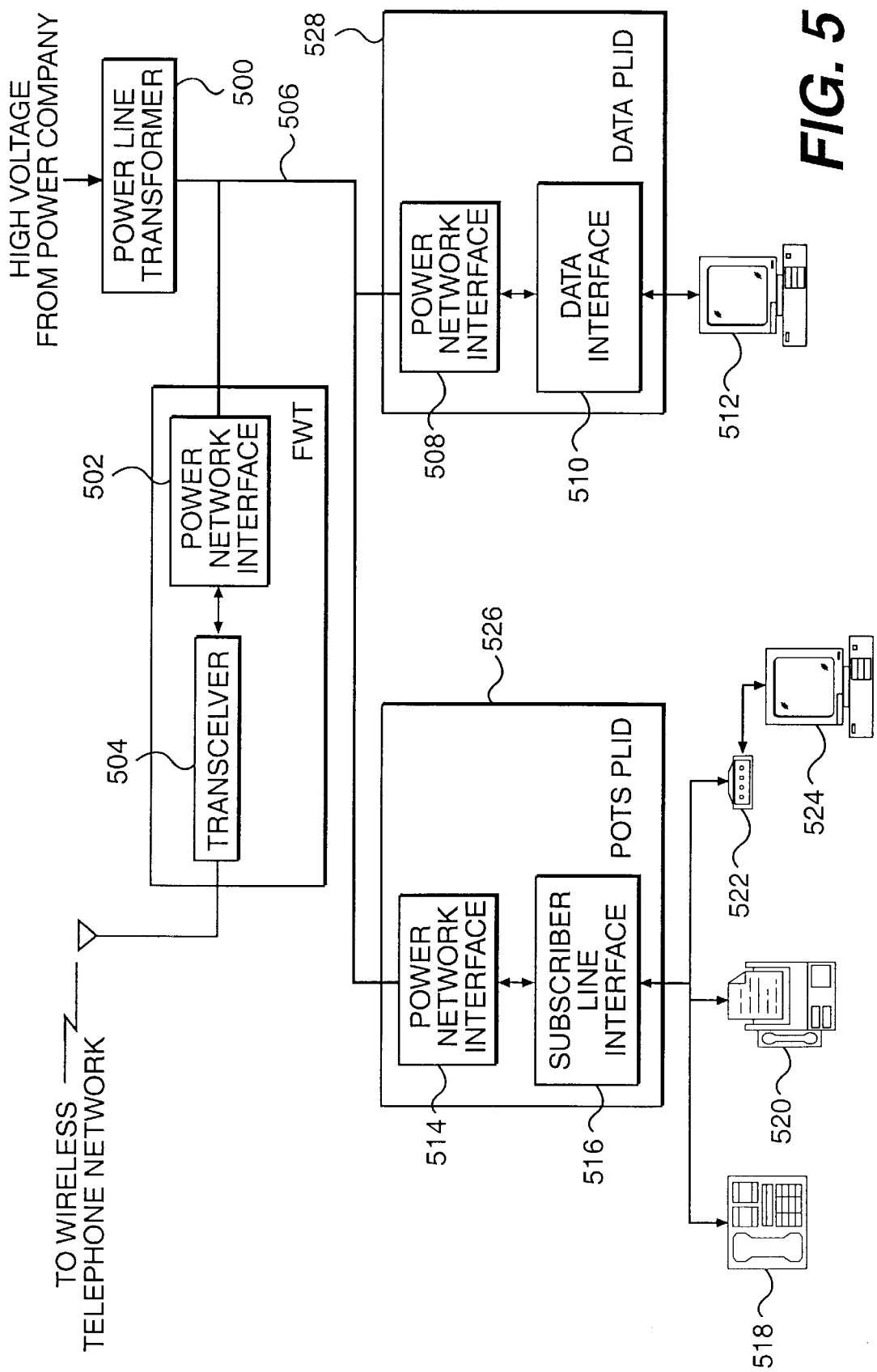
FIG. 5: Block Diagram Using Power Lines as Telecommunication Distribution System

Referring to FIG. 5 a general block diagram of the system is shown. As noted earlier the power line transformer 500 receives high voltage from the power company and provides isolation for communications signals coming from a transformer cluster. This allows for re-use of the same address on power lines between different transformer clusters. The FWT comprises a power network interface 502 and a transceiver 504. As noted earlier, this transceiver is of the Dynaloop family of transceivers available from Dynamic Telecommunications, Inc. of Germantown, Md. The power network interface module such as an AN1000 from Adaptive Networks, Inc. of Cambridge, Mass. is also used. The transceiver 504 interfaces between the wireless network and the power line network. All telecommunication signals exist on the power lines between the power line step-down power transformer and the individuals home/businesses. The power line 506 provides the means of transmitting telecommunication signals from homes or businesses to the transceiver 504. The FWT is connected to PLID's in the network 526, 528 via the power line 506. The PLID has a power network interface 508 and a subscriber interface 510 (in this case a data interface is shown). The PLID is thereafter connected to a computer 512. Alternatively in a telephone installation, the power network interface 514 is connected to a subscriber line interface 516 (in this case a telephone PLID is shown). Connected to the POTS PLID is a telephone 518, a fax 520, a modem 522 which in turn is connected to a computer 524. Individual pieces of equipment or groups of equipment can be connected in the manner shown.

A significant additional advantage to this system is the fact that the FWT has a connection to the power company's power meter. In this fashion individual FWT's can receive information directly from the power meter at individual homes or businesses and communicate that power utilization information in a wireless fashion to the power company. Thus not only does the present invention provide for inexpensive means for telecommunication but also provides an additional advantage to the power company to send utilization information to it without the need for sending trucks and meter readers to record the required power utilization information.

A flexible inexpensive wireless communications network using power lines has been shown. Other specific pieces of equipment may be used to accomplish the same communications goals and objectives of the present invention without departing from the spirit of the invention as disclosed.

What is claimed is:

1. A wireless local distribution system using standard power lines comprising:
    (a) a step-down power transformer;
    (b) external power lines connected to the step-down power transformer;
    (c) a transformer cluster formed by the step-down power transformer and external power lines;
    (d) subscriber facilities comprising internal power lines connected to the external power lines;
    (e) at least one power line interface device connected to the internal power lines further comprising interface means;
    (f) telecommunications equipment providing signals connected to the power line interface device interface means, wherein the telecommunications equipment is selected from the group consisting of telephones, faxes, and computers;
    (g) fixed wireless terminal equipment connected to the external power lines adapted to provide wireless communication and further adapted to receive the signals from the telecommunications equipment and to transmit the
    signals to a wireless local network; and
wherein the step-down power transformer provides signal isolation within the transformer cluster.

2. The wireless local distribution system using standard power lines of claim 1, wherein the power line interface device interface means is adapted to communicate using any communication protocol.

3. The wireless local distribution system using standard power lines of claim 2, wherein the power line interface device interface means is adapted to connect to plain old telephone service.

4. The wireless local distribution system using standard power lines of claim 2, wherein the power line interface device interface means is adapted to connect to facsimile equipment.

5. The wireless local distribution system using standard power lines of claim 2, wherein the power line interface device interface means is adapted to connect to modem.

6. The wireless local distribution system using standard power lines of claim 2, wherein the power line interface device interface means is adapted to connect to a computer data port.

7. The wireless local distribution system using standard power lines of claim 1, wherein the power line interface device is adapted to connect to the internal power lines.

8. The wireless local distribution system using standard power lines of claim 1, wherein the power line interface device is adapted to connect to the external power lines.

9. The wireless local distribution system using standard power lines of claim 1, further comprising a power meter connecting the external and internal power lines and wherein the fixed wireless terminal is adapted to receive power meter signals and information from the power meter and to transmit the power meter signals and information to the power company.

10. The wireless local distribution system using standard power lines of claim 1, wherein the fixed wireless terminal equipment is adapted to provide telecommunication signals for a single subscriber facility via the power lines.

11. The wireless local distribution system using standard power lines of claim 1, wherein the fixed wireless terminal equipment is adapted to provide telecommunication signals for a plurality of subscriber facilities via the external power lines.

* * * * *